US005688404A

United States Patent [19]

Luke et al.

[11] Patent Number: 5,688,404
[45] Date of Patent: Nov. 18, 1997

[54] PHOSPHATE RECOVERY PROCESSES

[75] Inventors: Donald Allen Luke, Valrico, Fla.; Geoffrey Steven Gagen, Chesapeake, Va.

[73] Assignee: Allied Colloids Limited, West Yorkshire, England

[21] Appl. No.: 486,578

[22] Filed: Jun. 7, 1995

[51] Int. Cl.$^6$ .............................. B03D 3/06; B01D 21/01
[52] U.S. Cl. ........................ 210/734; 210/738; 210/907; 209/5
[58] Field of Search ................................ 210/906, 907, 210/734, 723, 738, 713; 209/5

[56] References Cited

U.S. PATENT DOCUMENTS

| | | |
|---|---|---|
| 3,118,832 | 1/1964 | Katzer . |
| 3,418,237 | 12/1968 | Booth . |
| 3,622,087 | 11/1971 | Oltmann . |
| 3,707,523 | 12/1972 | Ledden . |
| 3,977,971 | 8/1976 | Quinn et al. . |
| 4,194,969 | 3/1980 | Chung et al. . |
| 4,224,149 | 9/1980 | Balcerski . |
| 4,235,709 | 11/1980 | Baudet et al. . |
| 4,251,363 | 2/1981 | Chamberlain . |
| 4,265,770 | 5/1981 | Thomas . |
| 4,342,653 | 8/1982 | Halverson . |
| 4,555,346 | 11/1985 | Rosen . |
| 4,690,752 | 9/1987 | Shaw . |
| 5,178,774 | 1/1993 | Payne et al. . |

FOREIGN PATENT DOCUMENTS

| | | |
|---|---|---|
| 2399266 | 3/1979 | France . |
| 1466185 | 3/1977 | United Kingdom . |

OTHER PUBLICATIONS

Zhang et al., Minerals Engineering, vol. 8, No. 4/5, pp. 523–534 (1995).

Review of conventional practice in the industry on pp. 1–3 of the above–identified application.

"The Preparation and Evaluation of Superior Flocculating Agents for Phosphate Slimes" Progress Report NYO–7403, Oct. 30, 1956 United States Atomic Energy Commission La Mer et al.

"Chemical and Physical Beneficiation of Florida Phosphate Slimes", Bureau of the Mines Report #6163, 1963, Gary et al.

*Primary Examiner*—Thomas M. Lithgow
*Attorney, Agent, or Firm*—Sughrue, Mion, Zinn, Macpeak & Seas, PLLC

[57] ABSTRACT

A phosphate feed is separated into an enriched phosphate fraction and a waste aqueous stream which includes recoverable phosphate feed particles in an aqueous clay slime and which is flowed along a flow passage through a settling zone (where recoverable phosphate feed is recovered) into a quiescent sedimentation area where the slime settles, and water soluble polymeric flocculant for the slime is added to the aqueous stream to promote settling of the phosphate feed particles substantially without settling of slime in the settling zone and to accelerate sedimentation of flocculated slime in the sedimentation zone.

16 Claims, No Drawings

PHOSPHATE RECOVERY PROCESSES

BACKGROUND OF THE INVENTION

This invention relates to phosphate recovery processes in which a phosphate feed is separated in one or more primary separation stages into an enriched fraction, containing the phosphate values, and an aqueous waste which is a clay slime.

U.S. Pat. No. 4,342,653 describes flocculation of phosphate slime. The separation stages in a phosphate recovery process typically include cyclone separation of an aqueous slurry and flotation separation of an aqueous slurry. The disposal of the solids in the aqueous waste is generally conducted by sedimentation of the solids to form a solid waste. In order to facilitate sedimentation of all the solids in the waste it is known to flocculate the phosphate slime waste, for instance by adding a solution of water soluble polymeric flocculant to the waste in a vessel with all the solids being sedimented and removed from the vessel as a sediment for disposal.

With many phosphate feeds based on, for instance, fluorapatite, the primary separation of the phosphate values from the waste can be conducted efficiently such that the amount of phosphate values in the waste is very low. As lower grade deposits are processed, the percentage of the phosphate value that occurs in the 48 to 100 mesh size fractions increases and previously acceptable losses of these fractions are now considered excessive. Indeed, in many cases, the recovery of this fraction is economically necessary to the financial stability of some marginal deposits. This need to use inferior fractions results in use of fractions having higher slime content, which results in an increase in the viscosity of the aqueous slurries which are subjected to primary recovery procedures such as flotation and, especially, cyclone separation.

This has the result that the primary recovery procedures are conducted less efficiently and the amount of phosphate values in the waste is increased. For instance the amount of phosphate recovered from the feed may be depressed to below 95%, and even as low 90%, of the total phosphate values in the feed when conducting recovery by processes such as flotation and cycloning and the amount of phosphate values in the aqueous waste from such processes can be above 2%, and typically is in the range 3 to 5% by weight or more, based on the weight of total phosphate in the initial feed.

When the aqueous clay slime waste contains useful amounts of recoverable phosphate feed particles in suspension in the slime, it is known to flow the waste turbulently along a ditch or other flow passage through a settling zone in which the recoverable phosphate feed particles settle from the slime and to discharge the resultant waste (substantially free of phosphate feed particles) into a lagoon or other quiescent sedimentation area. The settled phosphate feed particles (substantially free of slime) are dug out of the ditch and returned to a primary separation stage and the slime is allowed to settle in conventional manner in the lagoon. Unfortunately the viscosity created by the slime or clay content of the aqueous waste tends to impede the settlement of the phosphate feed particles in the settling zone. This has the consequence that there is increased risk of phosphate feed particles being carried into the sedimentation area and the length of the settling zone can be undesirably high (rendering it inconvenient and inefficient to recover the phosphate feed particles from the zone).

Another disadvantage of the use of feeds having rather high clay or slime content is that the amount of aqueous slime for disposal of is increased, relative to processes in which the initial feed has a lower slime content, and so increased lagoons or other disposal areas are needed. Sedimentation of unflocculated slimes is extremely slow (for instance typically requiring a year or more to achieve a 10% solids content and perhaps 20 years to achieve a 30% solids content) and the supernatant which is formed may have rather poor clarity. This is undesirable since the supernatant frequently is recycled to the primary separation stages and the performance of such stages is impaired if the supernatant is of poor quality.

Since it is conventional to improve settlement or sedimentation processes of inorganic suspensions in general by the addition of a flocculant solution, it might be thought that the phosphate recovery process could be improved using a flocculant solution. Unfortunately the known methods of using a flocculant are not satisfactory. Polymeric flocculant is normally used as a solution and so make-up apparatus must be provided for its conventional use. The lagoon tends to be in a rather remote and inaccessible place and so the provision of make-up equipment at or near the lagoon is inconvenient. Also, phosphate feed particles entrained within the waste (due to its viscosity) will still be sedimented with the slime and so will be lost. Flocculating the waste in a clarifier, at the location of the primary separation processes, as we have done before, is inappropriate both because of the volume of slime that has to be handled and because of the loss of the phosphate values in the flocculated solids which are collected in the clarifier and dumped.

In conventional flocculation processes conducted on inorganic aqueous suspensions, the polymeric flocculant is fully dissolved before it is added to the suspension that is to be flocculated, but it is also known (for instance from U.S. Pat. No. 3,977,971) to add solid polymeric flocculant to a travelling suspension of inorganic particles whereby the polymeric flocculant dissolves into the aqueous phase of the suspension as it travels to a position where it is to be dumped. It is also known from U.S. Pat. No. 5,178,774 to add particles of a fast-dissolving polymeric, low molecular weight, coagulant to an inorganic suspension and to dissolve the polymer particles as the suspension travels through a process.

OBJECTS OF THE INVENTION

One object is to provide a process for recovering phosphate from a feed which includes clay slime and which can give effective, and preferably improved, recovery of recoverable phosphate feed particles and which can give effective, and preferably accelerated, sedimentation of the slime. Another object is to achieve these results despite the aqueous stream having high viscosity due to a high slime content. Another object is to provide a supernatant (from the sedimentation stage) which is of higher quality and thus is more suitable for recycling to primary separation stages.

SUMMARY OF THE INVENTION

The invention relates to a process in which a phosphate feed contaminated with clay is separated in one or more primary separation stages into one or more enriched fractions and a waste aqueous stream containing recoverable phosphate feed particles suspended in aqueous clay slime; the waste aqueous stream is flowed turbently from a flocculant dosing point along a flow passage which leads through a settling zone for recoverable phosphate-feed particles and discharges into a quiescent slime sedimentation area in which the slime sediments; and recoverable phosphate feed particles are settled in the settling zone and are recovered from the settling zone and returned to the one or more primary separation stages; and in this process settlement of the phosphate feed particles substantially in the absence of slime is accelerated in the settling zone, and sedimentation of slime in the quiescent sedimentation area is accelerated, by adding at the flocculant addition point a slime-flocculating amount of a water soluble polymeric flocculant for the slime.

In some embodiments of the invention the polymeric flocculant is added as a solution but in other embodiments it is added in solid form, as a powder or an aqueous, partially dissolved, slurry.

The polymeric flocculant is normally a high molecular weight water soluble polymer which is substantially non-ionic or which has a relatively low ionic content, usually a cationic content.

As a result of adding a flocculant for the slime, we surprisingly find that we accelerate the rate of settling of the phosphate feed particles in the settling zone substantially without settlement of slime in that zone, and we also accelerate the sedimentation of slime in the quiescent sedimentation area. The invention facilitates or improves the recovery of phosphates and improves the sedimentation in the slime sedimentation area. More water can be taken from the sedimentation are, without risk of recycling slime, than prior to the invention because of the more rapid settling and the clearer demarkation between supernatant and slime, and the useful life of the sedimentation area can be greatly increased, because of the greater density of the sediment. For instance an increase of at least two years in the useful life of a sedimentation area can be expected.

DESCRIPTION OF THE PREFERRED EMBODIMENTS

Fluorapitite or other phosphate feed or ore contaminated with clay which can form a slime is subjected to one or more conventional primary separation stages to produce an enriched phosphate fraction and a waste stream. The separation stages typically involve flotation and/or cyclone stages. For instance a slurry of the phosphate feed in water is formed and is separated into an Accept fraction (having a high and enriched phosphate value content) and a Reject fraction having a low phosphate value content. For instance the slurry may be separated by treatment in a cyclone and by flotation. The Reject may itself be subjected to cyclone separation. The purpose of the various primary stages is to try to separate relatively coarse phosphate feed particles from finer clay (or slime) particles. The invention is of particular value where the primary separation stages include one or more cyclone stages.

The primary separation stages result in the formation of a Reject which is a waste aqueous stream containing some recoverable phosphate feed particles suspended in an aqueous clay slime. Often aqueous wastes from several different primary stages are formed. They can be treated separately in the invention but usually they are combined in a launder or equivalent collector, such as a tank, to form a combined waste and one or more flows of a waste aqueous stream are flowed turbulently from the launder under gravity. The or each steam flows along a ditch or other flow passage through a settling zone and discharges into a slime sedimentation area.

The flow passage is normally very long, for instance above 500 meters and sometimes above 1,000 meters in length. The rate of flow through the passage is generally such that the stream takes several minutes, for instance at least two minutes and often five to ten minutes or more, for instance up to half an hour or an hour, to flow from the start of the ditch to the position where the ditch discharges into the sedimentation area.

The settling zone is that part of the total length of the ditch or other flow passage in which significant amounts of the phosphate feed particles settle during the turbulent flow of the aqueous stream along the ditch. The settling zone generally starts at or close to the entry point to the ditch from the launder and extends towards the opposite end of the ditch. It can be considered to terminate at a point where the amount of settlement is sufficiently low that it is not worth recovering settled phosphate feed particles on a regular basis from the ditch at that point. Generally the settling zone extends over a distance of at least 20 meters and often at least 50 meters or even 100 meters or more. Preferably the settling zone does not extend along more than two thirds, and preferably not more than half and most preferably not more than one third the length of the ditch. Preferably it is less than 300 meters long.

There can be a single ditch leading from the launder to the lagoon or other sedimentation area or there can be two or more such ditches.

The flow along the ditch must be sufficiently turbulent that significant settlement of slime does not occur within the ditch. The desired turbulence can be achieved merely by flowing the stream along an open ditch under gravity without providing additional means in the ditch for causing turbulence. For instance flow at above 30 meters per minute, preferably at least 45 m/min, is usually sufficient to prevent settlement of flocculated slimes in the ditch itself. However deliberate turbulence can be applied if required.

In the invention, we include water soluble polymeric flocculant in the aqueous stream and add this at a flocculant dosing point which can be in the ditch or other flow passage, usually at or near its inlet, but is preferably in the launder or other collector by which the stream is fed into the ditch.

It is desirable in the invention that the phosphate feed particles should remain substantially unflocculated and that the flocculant should instead be a flocculant for the slime. Surprisingly we have found that it is possible to add the flocculant ahead of the settling zone to accelerate the settling of the unflocculated phosphate feed particles in the substantial absence of slime, even though the flocculant flocculates the slime and generally does not flocculate the phosphate feed particles. The addition of the flocculant also has the effect of accelerating the sedimentation of the slime in the quiescent sedimentation area into which the flow passage discharges.

It would normally be expected that the flocculant would promote early settlement of flocculated slime but surprisingly it is easy to carry out the process so as to obtain accelerated settlement of the phosphate feed particles substantially in the absence in the flocculated slime. It seems that the addition of the flocculant causes a reduction in the viscosity of the aqueous stream that is flowing through the settling zone, thereby permitting faster settlement of the phosphate feed particles even though they are generally unflocculated, but the turbulence due to the flow through the settling zone is sufficient to prevent significant settlement of the flocculated slime. Thus, the amount of slime settlement is insufficient to cause significant filling of the ditch or contamination of the settled phosphate.

The differential between the settlement of the substantially unflocculated feed particles and the substantial nonsettlement of the flowing flocculated slime is probably due to the extremely small particle size and low density of the slime relative to the coarser and heavier phosphate feed particles. As a result, the turbulence due to the flowing of the stream through the ditch or other flow passage is sufficient to keep the flocculated slime substantially entrained in the stream, so that there is substantially no settlement of the flocculated slime in the settlement zone, while allowing settlement of the phosphate feed particles.

The clay slimes are generally provided by particles which are predominantly (e.g., at least 90% by weight) −200 mesh with a major amount, often at least 50% and sometimes at least 80% by weight being −325 mesh. The phosphate feed particles are much coarser and generally have a size of at least 50% and preferably at least 80% and usually at least 90% being +100 mesh.

The invention is of particular value when the primary separation stages result in the recovery of less than 95%, for instance less than 90%, by weight of the total phosphate values in the phosphate feed. The amount of phosphate feed particles in the aqueous stream is generally at least 1% by weight of the total phosphate values in the initial feed and typically is in the range 2 or 3% up to 5%, 7% or even 10%.

The amount of phosphate feed particles in the aqueous stream is generally at least 1%, based on the dry weight of the stream, and is frequently at least 2 or 3% and can be as much as 5 to 10% or more, for instance up to 15 or 20% (based on the dry weight of the stream). Similarly, the amount of phosphate feed particles recovered from the settling zone is generally at least i or 2% and can be 3 to 5% or even up to 10% or more, by weight based on the dry weight of the aqueous stream. The total solids content of the aqueous waste is generally in the range 0.5 to 10%, often around 1 to 3%, for instance 1½ to 2 or 2½%, with the major amount, and often at least 80% by weight of the solids being clay slimes.

The amount of flocculant that is used in the invention can be determined by routine experimentation and is generally in the range 0.1 to 10 pounds per ton aqueous waste (dry weight polymer based on dry weight waste).

The turbulence created by gravity flow or other means in the ditch or other flow passage is sufficient to keep the flocculated slime in suspension and prevent unacceptably large amounts of slime depositing in the settling zone or elsewhere in the ditch, but when the stream enters the sedimentation area the quiescent conditions in that area result in sedimentation of the flocculated solids. The rate of settling in the lagoon or other sedimentation area is very much faster than in the absence of the flocculant. For instance the rate of settling can be increased by a factor of more than 50. Whereas it would have taken months or even years to achieve a slime density of 10 to 12% without the addition of flocculant, in the invention such densities can be achieved within 8 to 10 hours. Indeed, 80% water recovery can be obtainable within a few days. As a result of the invention, the sediment density is greatly increased and the material is more convenient for disposal. Supernatant clarity is improved, rendering the supernatant more suitable for recycling to the primary separation processes and/or for use in making up the polymer solution.

It is generally preferred to use flocculant polymers that have intrinsic viscosity above 4 dl/g and generally above 8 dl/g, although in some instances useful flocculation can be achieved with relatively low molecular weight polymers having intrinsic viscosity from 1 to 4 dl/g. Intrinsic viscosity in this specification is determined using suspended level viscometer in 1M sodium chloride solution buffered to pH 7 at 25° C. When the polymer is non-ionic or anionic, intrinsic viscosity typically may be in the range 10 to 30 dl/g but when the polymer is cationic the intrinsic viscosity typically is in the range 8 to 18 dl/g.

The polymer is usually formed from a water soluble ethylenically unsaturated monomer or monomer blend. If the polymer is anionic, it is generally formed from a blend of water soluble anionic and non-ionic monomers. If the polymer is cationic, it is generally formed from a blend of water soluble non-ionic and cationic monomers.

The preferred non-ionic monomer is acrylamide, but other conventional non-ionic water soluble monomers can be used.

The preferred anionic monomers are ethylenically unsaturated carboxylic and sulphonic acid monomers, especially (meth)acrylic acid and 2-acrylamidomethyl propane sulphonic acid (AMPS).

The preferred cationic monomers are dialkylaminoalkyl (meth)-acrylates and -acrylamides, generally as their acid addition or quaternary ammonium salts, and diallyl dimethyl ammonium chloride and other diallyl quaternary monomers.

Preferred polymers for use in the invention are formed of 0 to 30% by weight ionic (usually cationic) monomer with the balance acrylamide. In particular, suitable flocculant polymer is non-ionic polyacrylamide or, preferably, polymer formed from 1 to 20%, often 2 to 10%, by weight cationic monomer (for instance dimethylaminoethyl acrylate quaternary salt) with the balance acrylamide.

The polymer may be provided initially as an aqueous solution typically having a polymer content of 0.01 to 3% by weight, for instance by dissolving water soluble polymer powder or reverse phase emulsion or dispersion polymer in water. The solution may be made using conventional make-up apparatus. In some processes, however, it is preferred to add the flocculant to the aqueous waste at the dosing point in solid form, either as a powder or as a slurry of powder in a liquid, generally water. Thus the powder may be pre-wetted with water so as to start dissolution before addition to the waste. The powder particles then continue to dissolve in the waste and are fully dissolved by the time the waste is discharged from the flow passage into the sedimentation area.

If powdered polymer or an aqueous slurry of polymer particles is being added, in some instances it can be desirable that the amount of flocculant polymer that has dissolved by the time the aqueous stream leaves the settling zone should be less than the amount required for achieving full flocculation of the slime, and in some instances much less than the slime flocculating amount (for instance not more than 70% and often not more than 50% of the slime flocculating amount. By this means it is possible to minimise the risk of slime flocs being settled with the phosphate feed particles in the settling zone whilst still attaining the desirable results of acceleration in the settlement of the phosphate feed particles and acceleration in the rate of sedimentation of the flocculated slime particles in the quiescent sedimentation area.

When the polymer is being added as a powder or slurry, it is preferably provided as particles in the range 0.1 to 1 mm, typically around 0.2 to 0.7 mm particle size.

The particles can be made by gel polymerisation followed by comminution and drying or by reverse phase bead polymerisation followed by recovery of dry beads, in conventional manner.

Although the process is normally operated using a single polymer addition of a single polymer, it is possible to apply polymer to the waste steam at two or more different positions. For instance some polymer can be added as solution, powder or slurry at the launder or other early position in the ditch, as described above, and further polymer can be added later in the ditch (after the settling zone) or at the entry to the sedimentation area. For instance erodable blocks comprising the polymer may be positioned in the ditch and flow of the aqueous stream over the blocks may erode them and dissolve the polymer into the stream.

EXAMPLE

A fluorapitite ore containing clay slimes is subjected to various disaggregation processes including flotation and cycloning processes conducted on an aqueous mixture of the ore and water, in conventional manner. The Reject streams from such processes are passed through cyclones to remove relatively coarse phosphate feed particles and to provide a waste aqueous stream having a solids content of about 2% wherein the solids are more than 90% by weight phosphate slime particles having a size below −200 mesh together with coarser phosphate feed particles having a size of above 100 mesh.

Several such aqueous streams are fed into a launder having dimensions of approximately 1.3 meters by 1 meter by 400 meters. This launder feeds, under gravity, a settling ditch having a width of about 6 meters and a length of about 1,000 meters and which discharges at about 40,000 gallons per minute into a lagoon having an area of about 500 hectares.

In a conventional process, some settlement of phosphate feed particles occurs over the first 100 to 200 meters in the ditch to an extent sufficient to justify digging the phosphate feed particles from the ditch from time to time and returning them to the primary stages. The feed that is discharged into the lagoon takes more than a year to settle to a density of 10% solids.

In the invention, a water soluble polymeric flocculant of 97% by weight acrylamide and 3% by weight dimethylaminoethyl acrylate quaternised with methyl chloride and having intrinsic viscosity about 14 dl/g is added in the launder. It is provided as a solution of around 0.25% polymer in water at a dosage of 0.35 pounds polymer per ton (dry weight) clay. Settling of the phosphate feed particles in the settling zone occurs as before, but at a faster rate and over a shorter distance, substantially without settling of any flocculated slime. Sedimentation of the slime occurs rapidly within the lagoon to give 10% solids within 2 days and a relatively clear supernatant.

In a modification of this process, the polymeric flocculant is provided at the same dosage as particles having an average size of about 500 μm and these are slurried with supernatant from the lagoon to provide a polymer content of around 0.25%. After 25 minutes stirring, when the particles are partially dissolved, the aqueous slurry is fed into the launder. Satisfactory results are achieved.

We claim:

1. A process in which a phosphate feed is separated in one or more primary separation stages into one or more phosphate enriched fractions and a waste aqueous stream containing recoverable phosphate feed particles suspended in an aqueous clay slime, the waste aqueous stream is flowed turbulently from a flocculant dosing point along a flow passage which leads through a settling zone for recoverable phosphate feed particles and discharges into a quiescent slime sedimentation area in which the slime sediments, and recoverable phosphate feed particles are settled in the settling zone and are recovered from the settling zone and returned to the one or more primary separation stages, and settlement of the phosphate feed particles substantially in the absence of the slime is accelerated in the settling zone and sedimentation of the slime is accelerated in the quiescent sedimentation area by flocculating the slime while the phosphate feed particles remain substantially unflocculated by adding a slime-flocculating amount of a water soluble polymeric cationic flocculant for the slime at the flocculant dosing point.

2. A process in which a phosphate feed is separated in one or more primary separation stages into one or more phosphate enriched fractions and a waste aqueous stream containing recoverable phosphate feed particles suspended in an aqueous clay slime, the waste aqueous stream is flowed turbulently from a flocculant dosing point along a flow passage which leads through a settling zone for recoverable phosphate feed particles and discharges into a quiescent slime sedimentation area in which the slime sediments, and recoverable phosphate feed particles are settled in the settling zone and are recovered from the settling zone and returned to the one or more primary separation stages, and the slime is flocculated, while the phosphate feed particles remain substantially unflocculated, before or during flow through the settling zone by addition of a slime-flocculating amount of water soluble polymeric cationic flocculant for the slime at the flocculant dosing point, the flocculated slime is held in suspension by the flow of the waste stream through the flow passage, the phosphate feed particles settle in the settling zone while substantially unflocculated, and the flocculated slime sediments in the quiescent sedimentation area.

3. A process according to claim 1 in which the clay slimes have a particle size of at least 80%–325 mesh and the phosphate feed particles have a size of at least 80% being +100 mesh.

4. A process according to claim 1 in which the polymer is a polymer of at least 70 weight percent water soluble, non-ionic, ethylenically unsaturated monomer and a predetermined amount up to 30 mole percent water soluble cationic ethylenically unsaturated monomer.

5. A process according to claim 1 in which the polymer is a polymer of 80 to 99% by weight acrylamide and 1 to 20% by weight dialkylaminoalkyl (meth) -acrylate or -acrylamide.

6. A process according to claim 1 in which the polymer has intrinsic viscosity at least 8 dl/g.

7. A process according to claim 2 in which the clay slimes have a particle size of at least 80%–325 mesh and the phosphate feed particles have a size of at least 80% being +100 mesh.

8. A process according to claim 2 in which the polymer is a polymer of at least 70 weight percent water soluble, non-ionic, ethylenically unsaturated monomer and a predetermined amount up to 30 mole percent water soluble cationic ethylenically unsaturated monomer.

9. A process according to claim 2 in which the polymer is a polymer of 80 to 99% by weight acrylamide and 1 to 20% by weight dialkylaminoalkyl (meth) -acrylate or -acrylamide.

10. A process according to claim 2 in which the polymer has intrinsic viscosity at least 8 dl/g.

11. A process according to claim 1 in which the polymer is added to the aqueous stream as a solution of the polymer in water.

12. A process according to claim 1 in which the polymer is added to the aqueous stream as a powder or as a slurry of partially dissolved polymer particles in water.

13. A process according to claim 1 in which the amount of phosphate recovered by the one or more primary separation stages is below 95% of the total phosphate values in the phosphate feed and the amount of phosphate feed particles recovered from the settling zone is at least 1% by weight of the total phosphate values in the feed and is at least 1% by weight of the dry weight of the waste aqueous stream.

14. A process according to claim 1 in which the primary separation stages comprise a cycloning stage for separating phosphate feed particles from aqueous slime.

15. A process according to claim 1 in which the flow passage is a ditch under which the aqueous stream flows under gravity for more than 500 meters, the settling zone is at least 30 meters but is not more than half the length of the ditch.

16. A process according to claim 1 in which there are a plurality of the primary separating stages each of which yields an aqueous waste and the aqueous wastes are combined in a collector to form the waste aqueous stream, the sedimentation area is a lagoon and the flow passage is a ditch leading from the collector to the lagoon, and the flocculant dosing point is in the collector.

* * * * *